Patented Mar. 30, 1926.

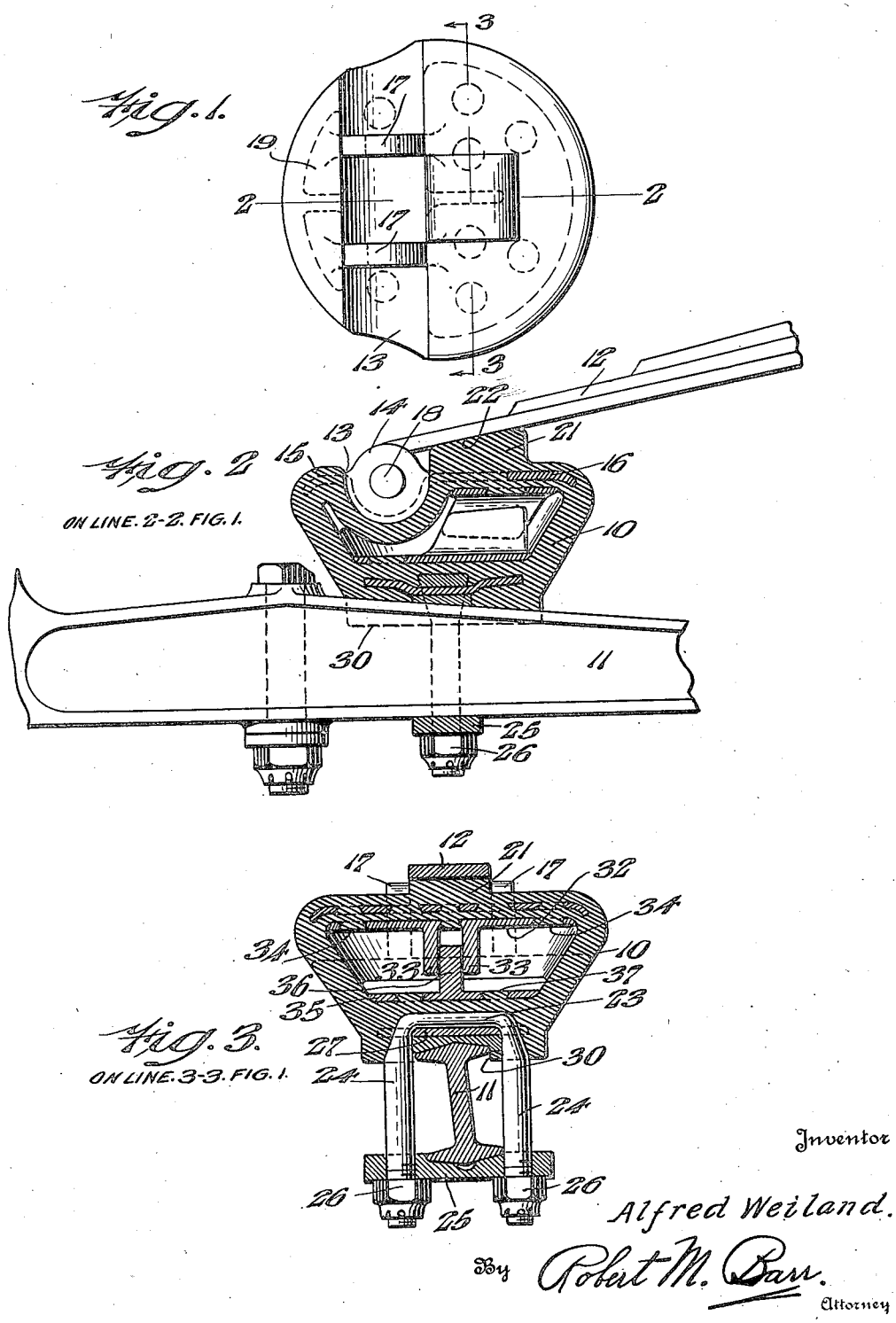

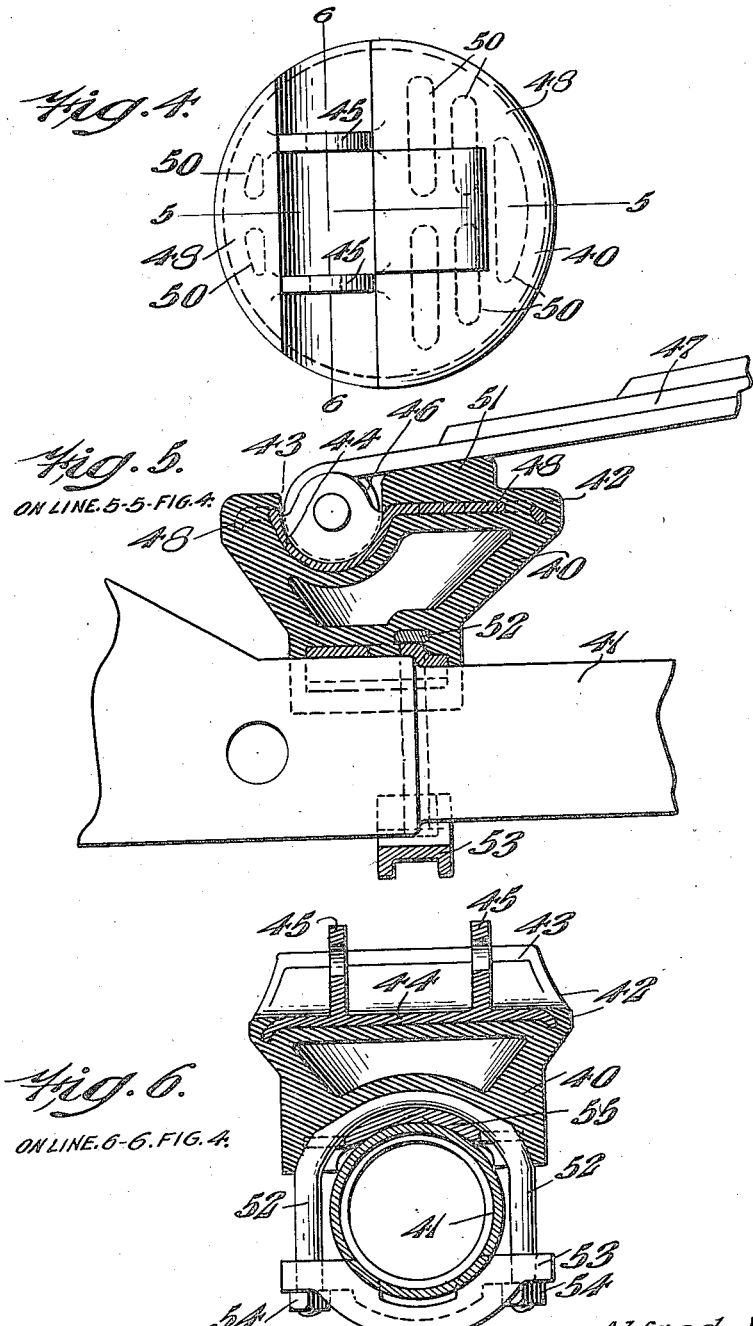

1,579,187

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

SHOCK ABSORBER.

Application filed August 6, 1925. Serial No. 48,555.

*To all whom it may concern:*

Be it known that I, ALFRED WEILAND, a citizen of the United States, and a resident of Neshanic, county of Somerset, State of New Jersey, have invented certain new and useful Improvements in Shock Absorbers, of which the following is a specification.

The present invention relates to shock absorbers and more particularly to a device of this character arranged to function in conjunction with an end of a vehicle spring.

Some of the objects of the present invention are to provide an improved means for absorbing and eliminating shocks normally transmitted to the body of a vehicle during its progress along a road or highway; to provide an improved pneumatic shock absorber; to provide an expansible member arranged to be interposed between an end of a vehicle spring and a part of the vehicle frame or axle; to provide a compression type of shock absorber having means to restrict and eliminate side sway of the body of a vehicle; to provide improved reinforcing means for shock absorbers of the cushioning type; and to provide other improvements as will hereinafter appear.

In the accompanying drawings, Fig. 1 represents a plan of a shock absorber embodying one form of the present invention; Fig. 2 represents a section on line 2—2 of Fig. 1; Fig. 3 represents a section on line 3—3 of Fig. 1; Fig. 4 represents a plan of a shock absorber embodying another form of the invention; Fig. 5 represents a section on line 5—5 of Fig. 4; and Fig. 6 represents a section on line 6—6 of Fig. 4.

Referring to the drawings, one form of the invention is illustrated in Figs. 1, 2 and 3, as arranged to attach one end of a vehicle spring to the axle of the vehicle in order to absorb and lessen shocks ordinarily transmitted from axle to spring. In the present instance the shock absorbing element consists of a hollow expansible member 10, holding a medium, such as air under a predetermined pressure, which is preferably molded into the member in its process of manufacture. As here shown the member 10 is of generally circular contour considered in a horizontal plane, while having substantially an inverted truncated form considered in a vertical plane. Thus the lower wall of smaller area is arranged to seat on and be secured to an axle 11, and the relatively broad shock receiving top wall is arranged to receive an end of the vehicle spring 12.

In order to form a seat for the spring end and to pivotally connect such end to the member 10, the upper wall is molded with a transverse groove 13 of a suitable diameter to receive the eye lug 14 of the spring 12. As a means for attaching this eye lug 14 to the member 10, a plate 15 is provided having a body part 16 molded into the top wall of the member 10 and two ears 17 of apertured form concentrically located in the groove 13 so that the eye lug 14 can be received between them and pivotally held by a suitable bolt 18. The ends 19 of the ears 17 are respectively formed as T members which are molded into the member 10 at the opposite side of the groove 13. The body part 16 is firmly anchored in the molding process by the provision of holes 20 at suitable intervals into which the material of the member 10 is forced during the molding operation. Thus the plate 15 is not only fixed and firmly held to resist stresses applied to the ears 17 but also reinforces and strengthens the impact receiving wall of the member 10. Also the T-shaped ends resist any force acting in a direction to pull the ears 17 out of the groove 13.

For the purpose of transmitting movement of the spring 12 directly to the member 10 to thus avoid a sudden blow, the upper face of the member 10 is formed with a cushioning projection 21, which has its spring engaging surface 22 inclined or shaped to conform to the line of the spring and thus normally form a seat which is in contact with the spring under all operating conditions.

As a means for making the opposite end of the member 10 fast to the axle 11, it has the bridge piece 23 of a U-shaped bolt molded into its lower wall in such transverse relation as to straddle the axle 11. The projecting ends 24 of the bolt traverse a clamping plate 25 which passes under the channel or frame part 11 and is rigidly held by nuts 26 or like fastening means. To distribute the clamping action of the bridge part 23, the lower wall is molded with an insert 27 which extends transversely beneath the bridge piece 23 and to a suitable distance to either side thereof. The central portion of this insert dips under, but in contact with the piece 23, and thus transmits tension stresses throughout the wall so that shearing of the material of the member 10 about the bridge part is prevented. In connection with the seating of the member 10 upon the channel top, it will be noted that a recess 30 is formed in the bottom face of the member 10 to receive the top of the channel. This anchors the member 10 to the frame channel and prevents lateral relative movement between the two parts. Preferably also a wear plate 31 is interposed between the member 10 and the channel face in the recess 30 and allows the bolt to be tightened without breaking away the flexible wall of the member 10.

For the purpose of resisting and preventing side sway, the inner upper face of the member 10 has a base plate 32 molded into it, having two spaced ribs 33 integral therewith which extend in a depending position within the chamber of the member 10. The plate 32 is effectively anchored in place by tapered holes 34 into which the material of the member 10 is forced during the molding operation. In a like manner the inner lower face of the member 10 has a base plate 35 molded into it and having an upstanding rib 36 fitting snugly between the two depending ribs 33 so that while the plates 32 and 35 are free to move toward and away from each other, they can have no lateral relative movement. Tapered holes 37 in the plate 35 form anchoring openings to receive the member material during molding.

In Figs. 4, 5 and 6 a form of the invention is shown for use in constructions when the vehicle spring ends are supported from the axle of the vehicle. As thus shown a hollow expansible member 40 is employed having a generally truncated shape in section taken longitudinally of the vehicle axle 41, and a more nearly rectangular section taken transversely of said axle. The construction in both sections is such as to provide a relatively thick circumferential apex about the sides of the member 40, so that the riding action of the device is by way of expansion and contraction of the bounding walls as distinguished from any expansion laterally. The relatively thick top portion 42 of the member 40 is provided with a groove 43, formed during the molding operation, which extends transversely with respect to the axle 41 and has a reinforcing metal lining 44 formed with two vertically arranged ears 45 which are so spaced as to receive the eye end 46 of the vehicle 47. This lining 44 is embedded or molded into the top body portion of the member 40 by carrying its side extensions 48 laterally away from the groove 43 and providing openings 50 into which the material is forced. A cushion or resilient abutment 51 is formed on the outer upper face of the top portion 42 and forms a seat for a part of the end of the spring 47.

In order to mount the member 40 on the axle 41, a clamping element is provided consisting of a U-shaped shank 52 having its bridge part molded into the member 40 and its two ends receiving a clamping piece 53 which is held rigidly clamped to the axle 41 by nuts 54 on the ends of the shank 52. A reinforcing element 55 is molded into the member 40 in position to contact with the shank 52 and thereby resist any tendency of the latter to tear away from the resilient member 40.

From the foregoing it will be apparent that a complete unitary structure has been provided for absorbing shocks ordinarily transmitted through the vehicle springs to the body of the vehicle, and the arrangement is such that the device can be quickly applied to all standard spring attaching constructions whether the spring is shackled to a part of the vehicle frame or to the vehicle axle. It will further be observed that the shock resisting forces act substantially vertically, and side sway is practically eliminated.

Having thus described my invention, I claim:

1. In a shock absorber, the combination of a resilient member having a groove in its top to seat the end of a vehicle spring, means for securing said end in said groove, and means for anchoring the bottom of said member to a part of the vehicle.

2. In a shock absorber, the combination of a resilient member having a groove in its top to seat the end of a vehicle spring, means including a lining for said groove for securing said end in said groove, and means for anchoring the bottom of said member to a part of a vehicle.

3. In a shock absorber, the combination of a resilient member having a groove in its top to seat the end of a vehicle spring, means including a lining molded into said member for securing said end in said groove, and means for anchoring the bottom of said member to a part of the vehicle.

4. In a shock absorber, the combination of a resilient member having a groove in its top to seat the end of a vehicle spring, means including a lining molded into said member and having an integral pair of ears for securing said end in said groove, and means for anchoring the bottom of said member to a part of the vehicle.

5. In a shock absorber, the combination of a resilient member having a groove in its top to seat the end of a vehicle spring, means for securing said end in said groove, and means for anchoring the bottom of said member to a part of the vehicle.

6. In a shock absorber, the combination of a resilient member having a groove in its top to seat the end of a vehicle spring, means for securing said end in said groove, means forming a cushion between said spring and said member, and means for anchoring the bottom of said member to a part of the vehicle.

7. In a shock absorber, the combination of a resilient member having a groove in its top to seat the end of a vehicle spring, means for securing said end in said groove, a resilient abutment formed integral with the top of said member and arranged in the path of movement of said spring, and means for anchoring the bottom of said member to a part of the vehicle.

8. In a shock absorber, the combination of a hollow member containing a medium under pressure and having a groove formed in its top to seat the end of a vehicle spring, means for securing said end in said groove, means for anchoring the bottom of said member to a part of the vehicle, and means within said member for resisting side to side movement of the top of said member relative to the bottom thereof.

9. In a shock absorber, the combination of a hollow member containing a medium under pressure and having a groove formed in its top to seat the end of a vehicle spring, means for securing said end in said groove, means for anchoring the bottom of said member to a part of the vehicle, and means to resist shearing of said member by said anchoring means.

10. In a shock absorber, the combination of a hollow member containing a medium under pressure and having a groove formed in its top to seat the end of a spring, means for securing said end in said groove, means for anchoring the bottom of said member to a part of the vehicle, and a plate molded into the bottom of said member to resist shearing action of said anchoring means.

11. In a shock absorber, the combination of a hollow member having a pressure medium sealed therein, and having a top portion formed with a groove to seat an end of a vehicle spring, means for connecting said end to said member, and means molded into said member for clamping said member to a vehicle axle.

12. In a shock absorber, the combination of a hollow member having a pressure medium sealed therein and a transverse groove to receive the end of a vehicle spring, a lining for said groove anchored in said member and having two ears thereon, means for fastening the end of said spring to said ears, means molded into said member for clamping said member to a vehicle axle, and a reinforcing plate embedded in said member in position to resist movement of said clamping means.

Signed at New Brunswick, county of Middlesex, State of New Jersey, this 27th day of April, 1925.

ALFRED WEILAND.